United States Patent
Ye et al.

(10) Patent No.: US 9,686,128 B2
(45) Date of Patent: Jun. 20, 2017

(54) WIRELESS NETWORK ADAPTER AND SELF-CONFIGURATION METHOD OF SAME

(71) Applicants: Jun Ye, Shanghai (CN); Thierry Chiche, Grenoble (FR)

(72) Inventors: Jun Ye, Shanghai (CN); Thierry Chiche, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 44 days.

(21) Appl. No.: 14/437,937

(22) PCT Filed: Oct. 22, 2013

(86) PCT No.: PCT/CN2013/085694
§ 371 (c)(1),
(2) Date: Apr. 23, 2015

(87) PCT Pub. No.: WO2014/063615
PCT Pub. Date: May 1, 2014

(65) Prior Publication Data
US 2015/0280978 A1    Oct. 1, 2015

(30) Foreign Application Priority Data

Oct. 25, 2012  (CN) .......................... 2012 1 0414356

(51) Int. Cl.
*H04L 12/24*  (2006.01)
*H04W 24/02*  (2009.01)
(Continued)

(52) U.S. Cl.
CPC ......... *H04L 41/0803* (2013.01); *H04W 24/02* (2013.01); *H04L 63/18* (2013.01); *H04W 12/04* (2013.01); *H04W 88/08* (2013.01)

(58) Field of Classification Search
CPC . H04L 41/08; H04L 41/0803; H04L 41/0883; H04L 41/0886; H04W 24/02
See application file for complete search history.

(56) References Cited

U.S. PATENT DOCUMENTS

| 2007/0036358 A1 | 2/2007 | Nguyen et al. |
| 2012/0106527 A1 | 5/2012 | Ichikawa et al. |
| (Continued) | | |

FOREIGN PATENT DOCUMENTS

| CN | 102137395 A | 7/2011 |
| CN | 102137396 A | 7/2011 |
| (Continued) | | |

OTHER PUBLICATIONS

Chinese Office Action issued by the Chinese Patent Office from corresponding Chinese Application No. 201210414356.0 dated Jun. 20, 2016 [Full English Translation attached].

(Continued)

*Primary Examiner* — Pao Sinkantarakorn
(74) *Attorney, Agent, or Firm* — Lando & Anastasi, LLP

(57) ABSTRACT

Provided are a wireless network adapter and a configuration method of same. A wireless network adapter comprises: a self-configuration portion, used to configure the wireless network adapter as an access point adapter, and generate access information of a wireless network access point; a cable connection portion, connected to a second wireless network adapter, and used to transmit the access information to the second wireless network adapter and receive an acknowledgment message from the second wireless network adapter; and a wireless transceiver, connected to the second wireless network adapter. Another wireless network adapter comprises: a cable connection portion, used to receive access information from an access point adapter; a parameter storage portion, used to store the access information as a setting parameter; a self-configuration portion, used to (Continued)

configure the wireless network adapter as a client mode and generate an acknowledgment message; and a wireless transceiver, connected to a wireless network access point. Configuration of multiple wireless network adapters connected to each other may be implemented without any input parameter and without the need of access a configuration webpage by using a computer.

17 Claims, 6 Drawing Sheets

(51) Int. Cl.
    *H04W 12/04* (2009.01)
    *H04W 88/08* (2009.01)
    *H04L 29/06* (2006.01)

(56) References Cited

U.S. PATENT DOCUMENTS

2012/0257633 A1    10/2012  Gupta et al.
2013/0322295 A1*   12/2013  Radhakrishnan ..... H04W 24/02
                                                       370/254

FOREIGN PATENT DOCUMENTS

| CN | 102510404 A   | 6/2012  |
| CN | 102624694 A   | 8/2012  |
| EP | 2383901 A1    | 11/2011 |
| RU | 2304924 C2    | 8/2007  |
| WO | 2011144174 A1 | 11/2011 |

OTHER PUBLICATIONS

International Preliminary Report on Patentability from corresponding PCT/CN2013/085694 dated Jan. 30, 2014.

International Search Report from corresponding PCT/CN2013/085694 dated Jan. 30, 2014.

Extended European Search Report from corresponding European Application No. 13848912.5 dated Jan. 29, 2016, Sep. 19, 2016.

Notice of Allowance issued by the Russian Patent Office from corresponding Russian Patent Application No. 2015119465 issued Jul. 4, 2016 [English translation attached].

Second Chinese Office Action issued by the Chinese Patent Office from corresponding Chinese Application No. 201210414356.0 dated Feb. 13, 2017 [Full English Translation attached].

* cited by examiner

WIRELESS NETWORK ADAPTER AND SELF-CONFIGURATION METHOD OF SAME

This application is the U.S. National Phase Application under 35 U.S.C. §271 of International Application No PCT/CN2013/085694, filed Oct. 22, 2013, which claims priority to Chinese Patent Application No. CN/201210414356.0, filed Oct. 25, 2012. These prior applications are incorporated by reference herein in their entirety.

TECHNICAL FIELD OF THE DISCLOSURE

The present disclosure relates to the field of wireless network technology, and in particular, to a wireless network adapter and a self-configuration method of the same.

BACKGROUND

Currently, there are some electrical equipments with only wired network connection function. With development of the wireless network technology, it becomes a trend to interconnect such electrical equipments with wired network connection function via wireless connection.

In order to solve such a problem, wireless network adapters have been developed. A wireless network connection function is developed for an electrical equipment with wired connection function by connecting the electrical equipment with wired connection function to a wireless network adapter through its wired network connection port. As a result, multiple electrical equipments with only wired network connection function originally can be interconnected with each other through a wireless network.

However, the configuration process of the above wireless network adapter is very complicated, and needs to be performed with the aid of a computer having a web browser. Normally, a user needs to access the configuration webpage of the wireless network adapters via a web browser, and configure one of the wireless network adapters to operate in an access point mode (i.e., as an access point adapter) and configure other wireless network adapters to operate in a client mode (i.e., as client adapters) by setting the configuration webpage. In addition, it is needed to set, in the client adapters, a service set identifier (SSID), a verification mode, an encryption type and a security key of an access point adapter. In the above configuration process, it is needed to perform configuration through a computer and a web browser, and it is needed to perform configuration on every wireless network adapter one by one.

Therefore, a wireless network adapter which can be configured easily and a corresponding configuration method of the same are needed.

SUMMARY

The present disclosure is made in view of the above problem. An object of the present disclosure is to provide a wireless network adapter and a configuration method of the same, in which the configuration process of multiple wireless network adapters can be triggered by only connecting the multiple wireless network adapters to be configured with each other and choosing an access point adapter among the multiple wireless network adapters, that is, a self-configuration of multiple wireless network adapters is realized. In the self-configuration process, it is unnecessary to set the configuration parameters of the respective wireless network adapters respectively by a computer.

According to one aspect of the present disclosure, there is provided a wireless network adapter comprising: a self-configuration portion for configuring the wireless network adapter as a wireless network access point adapter and generating access information of the wireless network access point adapter including a service set identifier, a verification mode, an encryption type and a security key; a first cable connection portion connected to a second wireless network adapter via cable connection and for receiving the access information from the self-configuration portion and transferring the access information to the second wireless network adapter via the cable connection, and receiving an acknowledgment message of the second wireless network adapter from the second wireless network adapter via the cable connection; and a wireless transceiver connected to the second wireless network adapter via wireless connection.

Preferably, the wireless network adapter further comprises a configuration triggering portion for generating a trigger signal to trigger the self-configuration portion of the wireless network adapter to perform self-configuration. The configuration triggering portion can comprise a hardware button or switch and generate the trigger signal when the hardware button or switch is set in a triggering state. Alternatively, the configuration triggering portion can comprise a settable menu option on the wireless network adapter and generate the trigger signal when the settable menu option is set in a triggering state.

Preferably, the wireless network adapter further comprises an indication portion for indicating that the self-configuration of the wireless network adapter is completed.

According to another aspect of the present disclosure, there is provided a wireless network adapter comprising: a first cable connection portion for receiving access information of a wireless network access point adapter from the wireless network access point adapter via cable connection, the access information including a service set identifier, a verification mode, an encryption type and a security key; a parameter storage portion for storing the access information as setting parameters; a self-configuration portion for configuring the wireless network adapter to operate in a client mode in the case that the first cable connection portion has received the access information, and generating an acknowledgment message after its self-configuration is completed; and a wireless transceiver connected to a wireless network access configured by the wireless network access point adapter by using the service set identifier and the security key, wherein the first cable connection portion also sends the acknowledgment message to the wireless network access point adapter via the cable connection.

Preferably, in the wireless network adapter, the first cable connection portion is directly connected to the wireless network access point adapter via the cable connection, or is connected to a second wireless network adapter via the cable connection and receives the access information of the wireless network access point adapter from the second wireless network adapter.

Preferably, the wireless network adapter further comprises: a second cable connection portion connected to a third wireless network adapter via cable connection, transferring the access information to the third wireless network adapter via the cable connection, and receiving an acknowledgment message of the third wireless network adapter from the third wireless network adapter via the cable connection. The first cable connection portion is further used to forward the acknowledgment message of the third wireless network adapter to the wireless network access point adapter.

Preferably, the wireless network adapter further comprises an indication portion for indicating that the self-configuration of the wireless network adapter is completed.

According to another aspect of the present disclosure, there is provided a self-configuration method for a wireless network adapter, comprising: the wireless network adapter configuring itself as a wireless network access point adapter and generating access information of the wireless network access point adapter after receiving a self-configuration instruction, the access information including a service set identifier, a verification mode, an encryption type and a security key; the wireless network adapter transferring the access information to a second wireless network adapter via cable connection; the wireless network adapter receiving an acknowledgment message from the second wireless network adapter via the cable connection; and connecting the wireless network adapter to the second wireless network adapter via wireless connection.

According to another aspect of the present disclosure, there is provided a self-configuration method for a wireless network adapter, comprising: the wireless network adapter receiving access information of a wireless network access point adapter from the wireless network access point adapter via cable connection and storing the access information as setting parameters, the access information including a service set identifier, a verification mode, an encryption type and a security key; the wireless network adapter configuring the wireless network adapter to operate in a client mode in the case that the wireless network adapter has received the access information, and generating an acknowledgment message after its self-configuration is completed; connecting the wireless network adapter to the wireless network access point configured by the wireless network access point adapter by using the service set identifier and the security key; and the wireless network adapter sending the acknowledgment message to the wireless network access point adapter via cable connection.

Preferably, the self-configuration method further comprises: transferring the access information to a third wireless network adapter via cable connection; receiving acknowledgment message of the third wireless network adapter from the third wireless network adapter; and forwarding the acknowledgment message of the third wireless network adapter to the wireless network access point adapter via cable connection.

With the wireless network adapters and the configuration methods of the same according to the embodiments of the present disclosure, it is possible to realize the configuration of multiple wireless network adapters to be interconnected in a network without input parameters and without need for accessing configuration webpage through a computer, dramatically simplifying the configuration process of wireless network adapters.

BRIEF DESCRIPTION OF THE DRAWINGS

The above and other objectives, features and advantages will become clearer by describing embodiments of the present disclosure in detail in connection with the accompanying drawings, in which.

DETAILED DESCRIPTION

In the following, wireless network adapters and configuration methods of the same according to embodiments of the present disclosure will be described with reference to accompanying drawings.

The configuration process of wireless network adapters according to embodiments of the present disclosure is very simple, and can be performed without assistance of a computer and a webpage browser.

A configuration process of wireless network adapters according to an embodiment of the present disclosure will be described with reference to FIG. 1.

Figure 1:
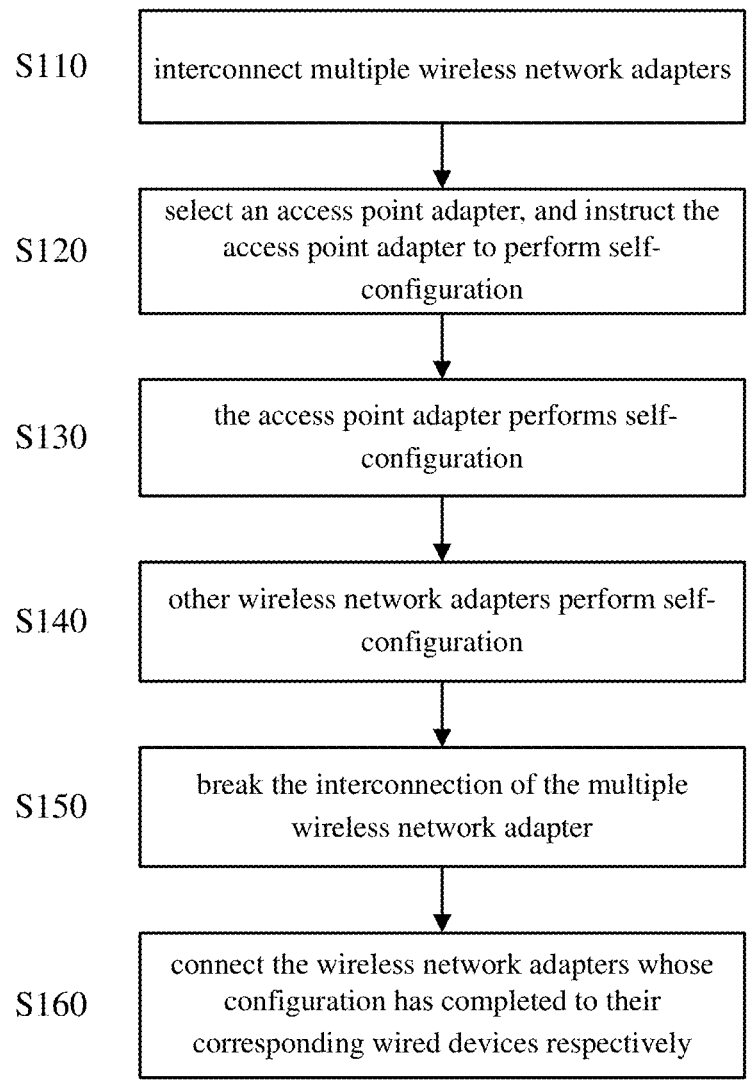
FIG. 1 is a schematic diagram showing a configuration process of multiple wireless network adapters according to an embodiment of the present disclosure.
Figure 6:
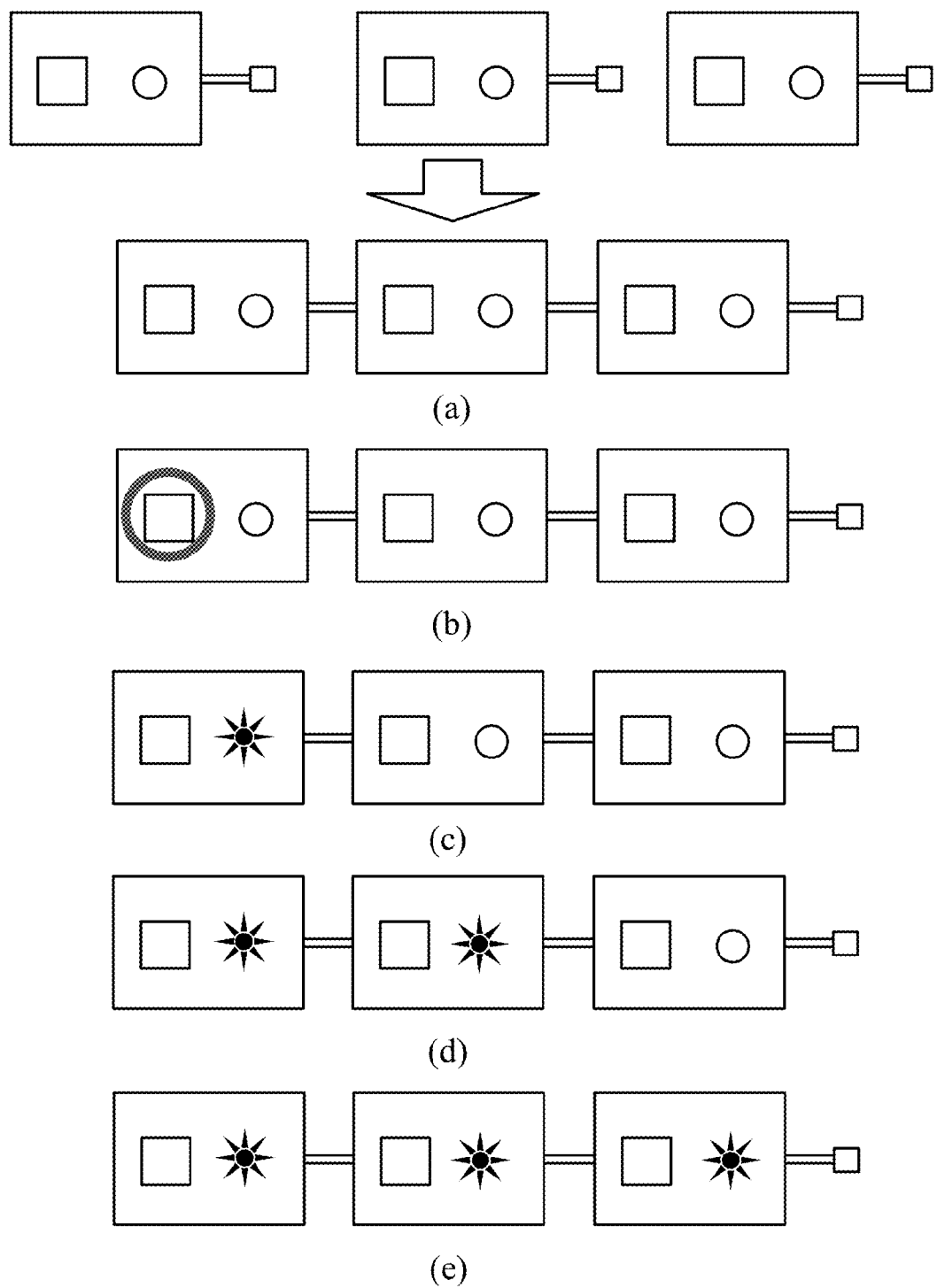
FIG. 6 is a schematic diagram showing an example in which the multiple wireless network adapters to be configured are connected with each other according to an embodiment of the present disclosure.

As shown in FIG. 1, at step S110, multiple wireless network adapters to be configured are first connected with each other, for example, the multiple wireless network adapters to be configured can be connected in series, as shown in FIG. 6. Alternatively, it is possible to connect one wireless network adapter with more than two wireless network adapters.

At step S120, a wireless network adapter desired to be configured as a wireless network access point is determined, that is, an access point adapter is determined, and the wireless network adapter is instructed to perform self-configuration.

Next, in step S130, the access point adapter performs self-configuration and generates access information. Then, in step S140, other wireless network adapters receive the access information from the access point adapter, and perform self-configuration based on the access information.

In step S150, the connection among the multiple wireless network adapters is broken. Finally, in step S160, the multiple wireless network adapters whose configuration has been completed are connected to wired devices corresponding thereto respectively.

It is noted that, in the configuration process of the wireless network adapters illustrated in FIG. 1, the configuration process of the multiple wireless network adapters can be triggered by only connecting the multiple wireless network adapters to be configured with each other and choosing an access point adapter among the multiple wireless network adapters, that is, a self-configuration of multiple wireless network adapters is realized. In the self-configuration process, it is not necessary to set the configuration parameters of the wireless network adapters respectively by a computer.

Next, in order for clear description, the configuration process of the access point adapter and the non-access point adapter (i.e., client adapter) will be described separately. It should be understood that the configuration process of the access point adapter and the configuration process of the client adapter according to an embodiment of the present disclosure are performed after the access point adapter and the client adapter are connected with each other.

Figure 2:
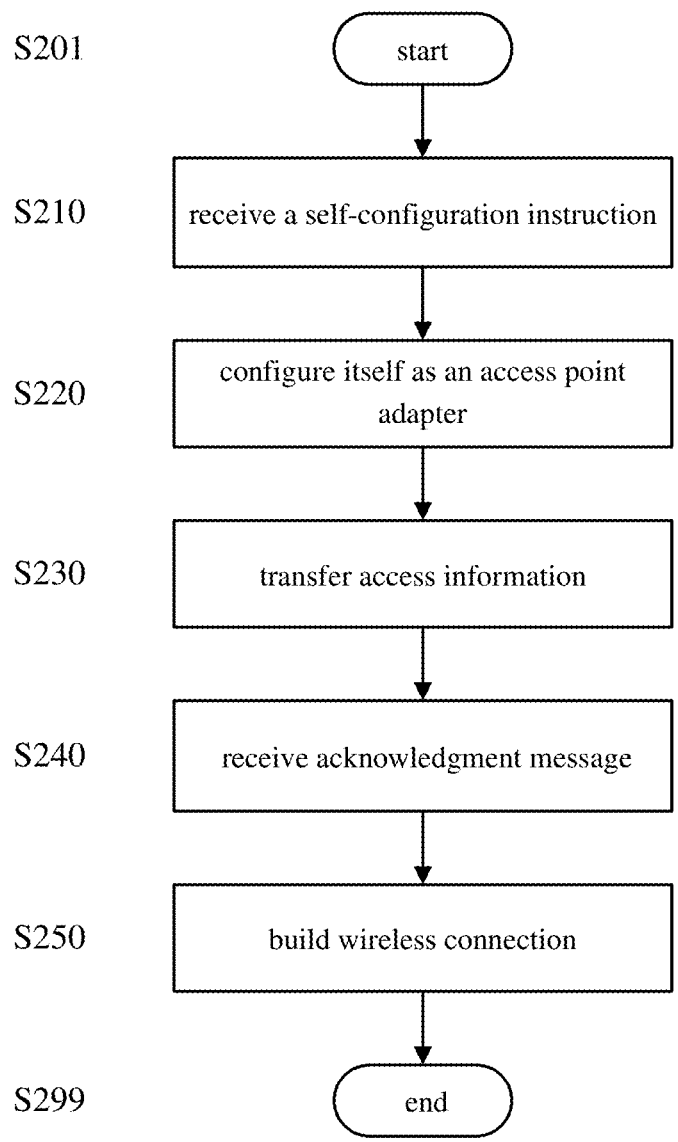
FIG. 2 is a schematic flowchart showing a configuration process of a wireless network adapter according to an embodiment of the present disclosure.

The configuration process of the access point adapter will be described with reference to FIG. 2. FIG. 2 shows a self-configuration method 200 of the wireless network adapter determined as the access point adapter according to an embodiment of the present disclosure.

The self-configuration method 200 for the wireless network adapter according to the embodiment of the present disclosure starts at step S201.

In step S210, the wireless network adapter receives a self-configuration instruction.

In step S220, the wireless network adapter configures itself as a wireless network access point adapter and generates access information of the wireless network access point adapter including a service set identifier (SSID), a verification mode, an encryption type and a security key.

In step S230, the wireless network adapter transfers the access information to a wireless network adapter connected thereto via cable connection.

In step S240, the wireless network adapter receives an acknowledgment message from the wireless network adapter connected thereto via cable connection.

In step S250, the wireless network adapter connects to the wireless network adapter connected thereto via wireless connection.

Finally, the self-configuration method 200 according to the embodiment of the present disclosure ends at step S299.

In the self-configuration method 200 according to the embodiment of the present disclosure, the access point adapter can not only receive the acknowledgment message from the wireless network adapter directly connected thereto (i.e., client adapter A), but also receive the acknowledgment message from the wireless network adapter indirectly connected thereto (i.e., client adapter B) through the wireless network adapter directly connected thereto (i.e. client adapter A).

In addition, in the self-configuration method 200 according to the embodiment of the present disclosure, the access point adapter can not only be wirelessly connected to the wireless network adapter directly connected thereto (i.e., client adapter A), but also be wirelessly connected to the wireless network adapter indirectly connected thereto (i.e., client adapter B).

In the self-configuration method 200 according to the embodiment of the present disclosure, the self-configuration instruction can be generated by a user setting a hardware button or switch installed on the access point adapter in a trigging state. For example, when the hardware button is pressed down or the switch is set in a ON state, the self-configuration instruction is generated.

In the self-configuration method 200 according to the embodiment of the present disclosure, the self-configuration instruction can be generated by a user setting a settable menu option on the wireless network adapter in a trigging state. For example, the access point adapter is provided with a display screen on which a settable menu option can be displayed, and the self-configuration instruction is generated when the settable menu option is set in an access point mode. In this case, the access point adapter can comprise a touch screen, a button, a mouse or the like that can operate the settable menu option.

In addition, in the self-configuration method 200 according to the embodiment of the present disclosure, the wireless network adapter can indicate that its self-configuration has been completed after the self-configuration is completed. For example, after the step S220 is completed, the wireless network adapter indicates that its self-configuration has been completed. The indication can be implemented by an indication light which can for example be a LED light and can emit light constantly or flash after the self-configuration is completed.

Figure 3:
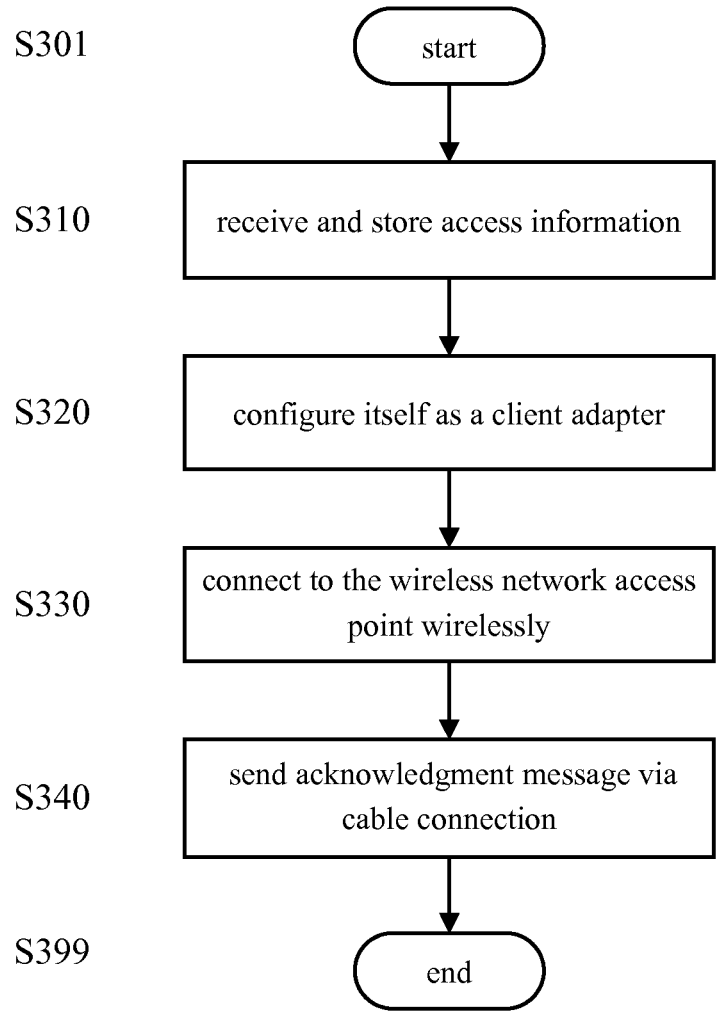
FIG. 3 is a schematic flowchart showing another configuration process of a wireless network adapter according to an embodiment of the present disclosure.

The configuration process of the client adapter will be described with reference to FIG. 3. FIG. 3 shows a self-configuration method 300 for a wireless network adapter determined to be a client adapter according to an embodiment of the present disclosure.

The self-configuration method 300 for a wireless network adapter according to the embodiment of the present disclosure starts at step S301.

In step S310, the wireless network adapter receives access information of a wireless network access point configured by a wireless network access point adapter from the wireless network access point adapter via cable connection and stores the access information as setting parameters. The access information includes a service set identifier, a verification mode, an encryption type and a security key.

In step S320, the wireless network adapter configures itself to operate in a client mode, and generates an acknowledgment message after the self-configuration is completed.

In step S330, the wireless network adapter is connected to the wireless network access point configured by the wireless network access point adapter by using the service set identifier and the security key.

In step S340, the wireless network adapter sends an acknowledgment message to the wireless network access point adapter via cable connection.

Finally, the self-configuration method 300 according to the embodiment of the present disclosure ends at step S399.

In the self-configuration method 300 according to the embodiment of the present disclosure, the client adapter can not only receive the access information from the access point adapter directly connected thereto, but also receive the access information forwarded by another client adapter directly connected thereto from said another client adapter.

In the self-configuration method 300 according to the embodiment of the present disclosure, the client adapter can not only send the acknowledgment message to the access point adapter directly connected thereto, but also send the acknowledgment message to the access point adapter indirectly connected thereto through a wireless network adapter directly connected thereto.

In addition, in the self-configuration method 300 according to the embodiment of the present disclosure, the client adapter can also forward the access information received by it to other client adapters connected thereto. The client adapter can forward the access information after it has successfully completed its self-configuration, or can forward the access information to other client adapters directly connected thereto after receiving the access information regardless of whether the client adapter has successfully completed its self-configuration.

In addition, in the self-configuration method 300 according to the embodiment of the present disclosure, the client adapter can not only be wirelessly connected to the access point adapter directly connected thereto, but also be wirelessly connected to the access point adapter indirectly connected thereto.

In addition, in the self-configuration method 300 according to the embodiment of the present disclosure, the client adapter can indicate that its self-configuration has been completed after the self-configuration is completed. For example, the client adapter indicates that its self-configuration has been completed after the step S320 is completed. The indication can be implemented by an indication light which can for example be a LED light and can emit light constantly or flash after the self-configuration is completed.

Next, wireless network adapters according to embodiments of the present disclosure will be described with reference to FIG. 4 and FIG. 5.

Figure 4:
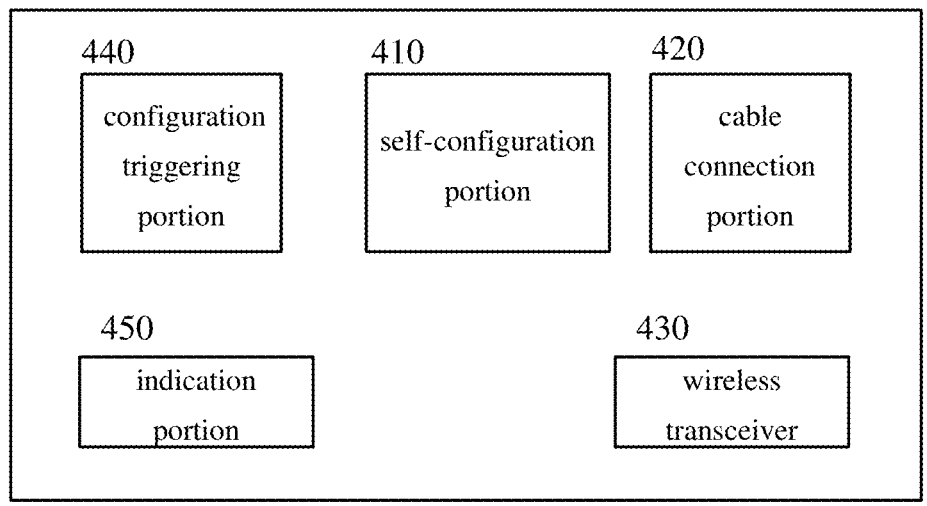
FIG. 4 is a schematic block diagram showing a wireless network adapter according to an embodiment of the present disclosure.

As shown in FIG. 4, it is shown a schematic block diagram of a wireless network adapter 400 according to a first embodiment of the present disclosure. The wireless network adapter 400 according to the first embodiment of the present disclosure is configured as an access point adapter in a wireless network.

The wireless network adapter 400 according to the first embodiment of the present disclosure comprises a self-configuration portion 410, a first cable connection portion 420 and a wireless transceiver 430.

The self-configuration portion 410 is used for configuring the wireless network adapter as a wireless network access point adapter and generating access information of a wireless network access point configured by the wireless network access point adapter, here the access information includes a service set identifier, a verification mode, an encryption type and a security key. The self-configuration portion 410 can be configured for example by a digital signal processor (DSP), a micro-processor (MCU) or the like.

The cable connection portion 420 is connected to another wireless network adapter (i.e., a client adapter) via cable connection, and is used for receiving the access information from the self-configuration portion 410 and transferring the access information to said another wireless network adapter via cable connection.

The cable connection portion 420 is further used for receiving an acknowledgment message of said another wireless network adapter from said another wireless network adapter via cable connection.

The cable connection portion 420 can comprise for example a wired network connection interface, and is connected to said another wireless network adapter through the wired network connection interface. However, the present disclosure is not so limited. The cable connection portion 420 can also comprise other wired connection interfaces through which the cable connection portion 420 is connected to another wireless network adapter as long as the wired connection interfaces can convey the access information.

Although only one cable connection portion 420 is shown in FIG. 4, it should be understood that the wireless network adapter 400 according to the first embodiment of the present disclosure can comprise multiple cable connection portions 420, each of which can be connected to one corresponding wireless network adapter (i.e., a client adapter); thereby it is possible to send the access information to the corresponding wireless network adapter and receive the acknowledgment message from the corresponding wireless network adapter. The acknowledgment message can be the acknowledgment message originating from the corresponding wireless network adapter itself, or can also be the acknowledgment message originating from a wireless network adapter in the downstream of the corresponding wireless network adapter and forwarded by the corresponding wireless network adapter.

The wireless transceiver 430 is connected to another wireless network adapter via wireless connection.

In addition, the wireless network adapter 400 according to the first embodiment of the present disclosure can further comprise a configuration triggering portion 440 for generating a trigger signal to trigger the self-configuration portion of the wireless network adapter to perform self-configuration.

The configuration triggering portion 440 can be implemented to comprise a hardware button or switch for generating the trigger signal, i.e. the self-configuration instruction, when the hardware button or switch is set in a triggering state. For example, when the hardware button is pressed down or the switch is set in a ON state, the self-configuration instruction is generated.

Alternatively, the configuration triggering portion 440 can also be implemented to comprise a settable menu option on the wireless network adapter for generating the trigger signal when the settable menu option is set in a triggering state. For example, the wireless network adapter 440 comprises a display screen on which a settable menu option can be displayed, and the self-configuration instruction is generated when the settable menu option is set in an access point mode. In this case, the wireless network adapter can comprise a touch screen, a button, a mouse or the like that can operate the settable menu option.

In addition, the wireless network adapter 400 according to the first embodiment of the present disclosure can also comprise an indication portion 450 for indicating that the self-configuration of the wireless network adapter has been completed after the self-configuration of the wireless network adapter is completed. For example, the indication portion 450 can be implemented as an indication light which can for example be a LED light and can emit light constantly or flash after the self-configuration is completed.

Next, a wireless network adapter 500 according to a second embodiment of the present disclosure will be described with reference to FIG. 5. FIG. 5 shows a schematic block diagram of a wireless network adapter 500 according to the second embodiment of the present disclosure. The wireless network adapter 500 according to the second embodiment of the present disclosure is configured as a client adapter in a wireless network.

The wireless network adapter 500 according to the second embodiment of the present disclosure comprises: a self-configuration portion 510, a first cable connection portion 520, a parameter storage portion 530 and a wireless transceiver 540.

The first cable connection portion 520 is used for receiving, from a wireless network access point adapter, access information of a wireless network access point configured by the wireless network access point adapter via cable connection. The access information includes a service set identifier, a verification mode, an encryption type and a security key.

The parameter storage portion 530 is used for storing the access information as setting parameters.

The self-configuration portion 510 is used for configuring the wireless network adapter to operate in a client mode in the case that the first cable connection portion 520 has received the access information, and generating acknowledgment message after its self-configuration is completed. The self-configuration portion 510 can be configured for example by a digital signal processor (DSP), a micro-processor (MCU) or the like.

The first cable connection portion 520 can also send an acknowledgment message to the wireless network access point adapter via the cable connection.

The wireless transceiver 540 is connected to the wireless network access configured by the wireless network access point adapter by using the service set identifier and the security key.

The first cable connection portion 520 can be directly connected to the wireless network access point adapter via cable connection to receive the access information directly from the wireless network access point adapter, or receive the access information forwarded by another client adapter from said another client adapter via cable connection.

In addition, the wireless network adapter 500 according to the second embodiment of the present disclosure can further comprise a second cable connection portion 550, which is connected to another wireless network adapter (e.g., another client adapter) via cable connection, and is used for transferring the access information to said another wireless network adapter via cable connection and receiving an acknowledgment message of said another wireless network adapter from said another wireless network adapter via cable connection.

In this case, the first cable connection portion 520 can be further used to forward the acknowledgment message of said another wireless network adapter received by the second cable connection portion 550 to the wireless network access point adapter. The first cable connection portion 520 can directly forward the acknowledgment message of said another client adapter to the wireless network access point adapter via cable connection, or can forward the acknowledgment message of said another client adapter to a client adapter in the upstream of the client adapter which then forwards the acknowledgment message to its upstream, such that the acknowledgement message is forwarded from downstream to upstream stage by stage until it reaches the wireless network access point adapter.

Figure 5:
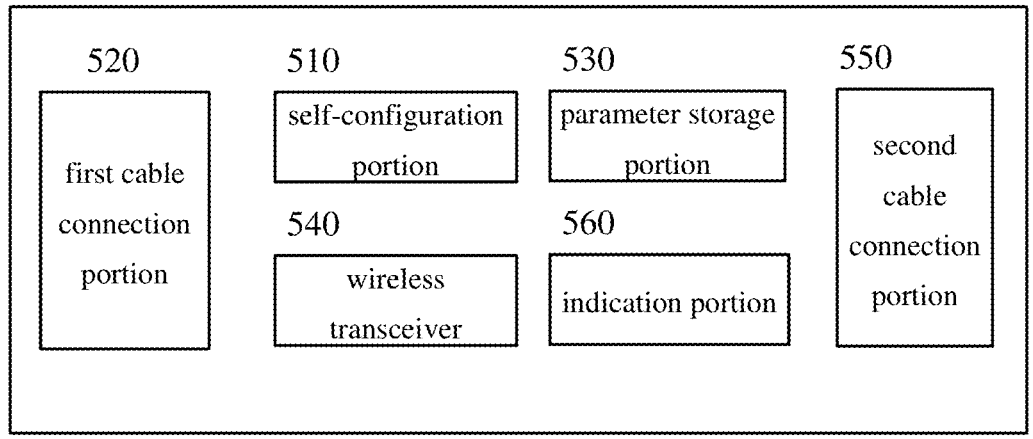
FIG. 5 is another schematic block diagram showing a wireless network adapter according to an embodiment of the present disclosure.

Although only one second cable connection portion 550 is shown in FIG. 5, it should be understood that the wireless network adapter 500 according to the second embodiment of the present disclosure can comprise multiple second cable connection portions 550, each of which can be connected to one corresponding wireless network adapter (i.e., a client adapter); thereby it is possible to send the access information to the corresponding wireless network adapter and receive an acknowledgment message from the corresponding wireless network. The acknowledgment message can be the acknowledgment message originating from the corresponding wireless network adapter itself, or can also be the acknowledgment message originating from a wireless network adapter in the downstream of the corresponding wireless network adapter and forwarded by the corresponding wireless network adapter.

The first cable connection portion 520 is connected to a client adapter in its upstream or directly connected to the access point adapter, so as to receive the access information of the wireless network access point.

The second cable connection portion 550 is connected to a client adapter in its downstream, so as to forward the access information of the wireless network access point to its downstream.

The first cable connection portion 520 and the second cable connection portion 550 can comprise for example wired network connection interfaces. However, the present disclosure is not so limited. The first cable connection portion 520 and the second cable connection portion 550 can also comprise other wired connection interfaces as long as the wired connection interfaces can convey the access information. Further, the first cable connection portion 520 and the second cable connection portion 550 can be a same type of wired connection interfaces, or can also be different types of wired connection interfaces.

In addition, the wireless network adapter 500 according to the second embodiment of the present disclosure can further comprise an indication portion 560 for indicating that the self-configuration has been completed after the wireless network adapter has completed its self-configuration. For example, the indication portion 560 can be implemented as an indication light which can for example be a LED light and can emit light constantly or flash after the self-configuration is completed.

In addition, the wireless network adapter 500 according to the second embodiment of the present disclosure can even comprise a configuration triggering portion (not shown) for generating a trigger signal to trigger the self-configuration portion of the wireless network adapter to perform self-configuration. In this case, the self-configuration operation will start only if the wireless network adapter receives both the trigger signal and the access information. However, it should be understood that, in order to simplify the configuration operation of the wireless network adapters, usually the self-configuration operation of the client network adapter is started as long as the client network adapter receives the access information, and it is unnecessary for the client network adapter to receive the trigger signal.

FIG. 6 shows a schematic diagram of an example in which the multiple wireless network adapters to be configured are connected with each other according to an embodiment of the present disclosure, wherein the multiple wireless network adapters are connected in serial (as shown in a) of FIG. 6), and a button and a indication light are shown on each of the wireless network adapters. However, it should be understood that the multiple network adapters can be connected with each other in other manners, and there can be no button on non-access point adapters (client adapters).

Next, the configuration processes 200 and 300 according to the embodiments of the present disclosure will be briefly described by an example of selecting "1" in FIG. 6 as an access point adapter.

The button on the adapter "1" is pressed (as shown in b) of FIG. 6), that is, the adapter "1" is selected as an access point adapter.

At step S210, the adapter "1" receives a self-configuration instruction.

At step S220, the adapter "1" configures itself as a wireless network access point adapter, and generates access information of a wireless network access point.

The indication light on the adapter "1" flashes or emits light constantly to indicate the self-configuration is completed (as shown in c) of FIG. 6).

At step S230, the adapter "1" transfers the access information to the adapter "2" via cable connection, and at step S310, the adapter "2" receives the access information from the adapter "1" via cable connection.

At step S320, the adapter "2" configures itself to operate in a client mode, and generates an acknowledgment message after its self-configuration is completed.

The indication light on the adapter "2" flashes or emits light constantly to indicate the self-configuration is completed (as shown in d) of FIG. 6).

At step S330 and step S250, the adapter "2" is connected to the adapter "1" wirelessly.

At step S340, the adapter "2" sends the acknowledgment message to the adapter "1" via cable connection. At step S240, the adapter "1" receives the acknowledgment message of the adapter "2" for the adapter "2" via cable connection.

The adapter "2" forwards the access information to the adapter "3" after receiving the access information or after its self-configuration is completed.

Then, the adapter "3" receives the access information from the adapter "2" via cable connection, the adapter "3"

configures itself to operate in a client mode after receiving the access information, and generates an acknowledgment message after its self-configuration is completed.

The indication light on the adapter "3" flashes or emits light constantly to indicate the self-configuration is completed (as shown in e) of FIG. 6).

Next, the adapter "3" is connected to the adapter "1" wirelessly, and the adapter "3" sends the acknowledgment message to the adapter "2" via cable connection. Then, the adapter "2" forwards the acknowledgment message of the adapter "3" to the adapter "1" via cable connection.

The above operations are repeated until all wireless network adapters complete their configuration.

Figure 7:
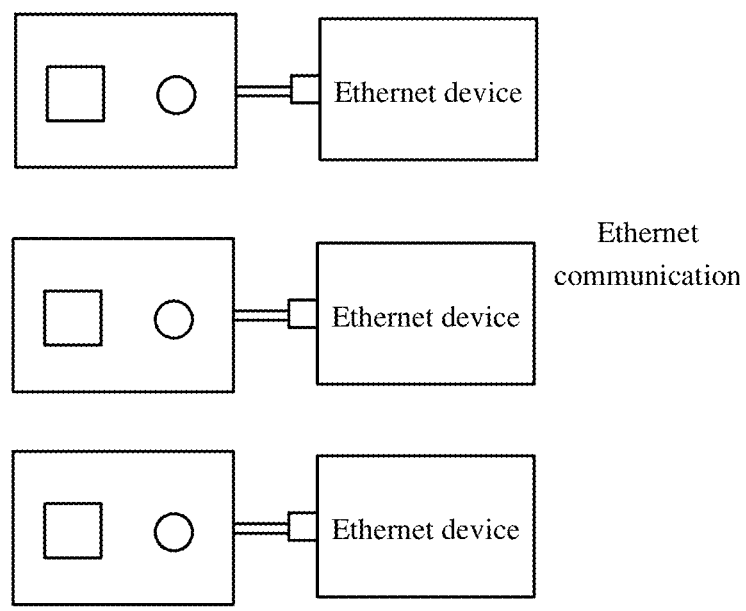
FIG. 7 shows connection of the multiple wireless network adapters whose configuration has been completed according to an embodiment of the present disclosure with wired network devices.

After the multiple wireless network adapters connected with each other complete their self-configuration, the connection among the multiple wireless network adapters is broken. Then, each of the wireless network adapters is connected to its corresponding wired network device such that multiple wired network devices can communicate with each other via wireless connection (as shown in FIG. 7).

According to an embodiment of the present disclosure, by accessing a dialogue webpage of each adapter, it is possible to display a list of all wireless network adapters. The list can comprise the access point adapter and the client adapters.

According to an embodiment of the present disclosure, for the access point adapter, it is also possible to use a dedicated webpage to achieve advanced settings, such as a SSID name, a verification mode, an encryption type, whether to hide the SSID network, and so on. However, in the embodiments of the present disclosure, the configuration process of the client adapters are dramatically simplified no matter whether or not advanced setting are performed on the access point adapter.

The wireless network adapters according to the embodiments of the present disclosure can be connected to for example a PLC system, a HMI system, or a motion and driving system. The PLC system, the HMI system and the motion and driving system are all provided with a wired network connection port. However, the wireless network adapters according to the embodiments of the present disclosure can also be connected to other systems provided with wired network connection ports.

According to an embodiment of the present disclosure, the access information and the acknowledgment message as described above can conform to TCP or UDP protocols, or can conform to other self-defined protocols based on Ethernet IP protocol.

It is noted that the wireless network adapters according to the embodiments of the present disclosure can comprise both the portions in the wireless network adapter 400 according to the first embodiment of the present disclosure and the portions in the wireless network adapter 500 according the second embodiment of the present disclosure. In this case, it is possible to configure any one of the multiple wireless network adapters connected with each other as the access point adapter, but it is not limited to configuring the first wireless network adapter in the series of wireless network adapters as the access point adapter.

Alternatively, it is possible to connect one wireless network adapter 400 according to the first embodiment of the present disclosure with multiple wireless network adapters 500 according to the second embodiment of the present disclosure (or the wireless network adapter 500 that comprises both the portions in the wireless network adapter 400 according to the first embodiment of the present disclosure and the portions in the wireless network adapter 500 according the second embodiment of the present disclosure). In this case, it is only possible to configure the wireless network adapter 400 as the access point adapter, and the configuration triggering portion 400 of the wireless network adapter 400 can be implemented by the processor in the wireless network adapter 400, for example, after the interconnection among the multiple wireless network adapters is completed, the wireless network adapter 400 can automatically start its self-configuration after determining that a predetermined time period expires. Therefore, the configuration triggering portion 440 is not limited to a tangible switch, button or setting menu.

According to an embodiment of the present disclosure, the access point adapter tests the client adapters through both cable connection and wireless network connection, such that it is reliably determined that all client adapters have been correctly configured.

After the above configurations, upon being powered up every time, the client adapter is connected to the wireless network access point configured by the access point adapter by using the stored SSID, verification mode, encryption type and security key.

Although the configuration processes of the access point adapter and the client adapter are described separately in the above, it should be understood that if a wireless network adapter A comprises both the portions in the wireless network adapter 400 according to the first embodiment of the present disclosure and the portions in the wireless network adapter 500 according the second embodiment of the present disclosure, the wireless network adapter A can be configured as an access point adapter or a client adapter, and the wireless network adapter A realizes the function of the access point adapter only when it is selected as the access point adapter, and realizes the function of the client adapter only when it is selected as the client adapter.

The wireless network adapters and configuration methods of the same according to the embodiments of the present disclosure dramatically simplify the configuration process of the existing wireless network adapters. It is possible to realize the configuration of multiple wireless network adapters to be interconnected in a network without input parameters and without need for accessing configuration webpage through a computer.

The above embodiments are only exemplary, and are not intended to limit the technical measures of the present disclosure. Although the present disclosure has been described in detail with reference to preferable embodiments, those skilled in the art can understand that the technical measures of the present disclosure can be modified or equivalently replaced without departing from the spirit and scope of the present disclosure. Those modifications and equivalent replacements also fall in the protection scope of the present disclosure.

What is claimed is:

1. A wireless network adapter comprising:
a self-configuration portion configured to:
configure the wireless network adapter as a wireless network access point adapter; and
generate access information of the wireless network access point adapter including a service set identifier, a verification mode, an encryption type and a security key;
a first cable connection portion connected to a second wireless network adapter via a cable connection, the first cable connection portion configured to:
receive the access information from the self-configuration portion;

transfer the access information to the second wireless network adapter via the cable connection; and
receive an acknowledgment message of the second wireless network adapter from the second wireless network adapter via the cable connection; and
a wireless transceiver connected to the second wireless network adapter via a wireless connection.

2. The wireless network adapter of claim 1, further comprising:
a configuration triggering portion configured to generate a trigger signal to trigger the self-configuration portion of the wireless network adapter to perform self-configuration.

3. The wireless network adapter of claim 2, wherein the configuration triggering portion includes one of a hardware button and a hardware switch, and is configured to generate the trigger signal when the one of the hardware button and the hardware switch is set in a triggering state.

4. The wireless network adapter of claim 2, wherein the configuration triggering portion includes a settable menu option on the wireless network adapter, and is configured to generate the trigger signal when the settable menu option is set in a triggering state.

5. The wireless network adapter of claim 1, further comprising:
a second cable connection portion connected to a third wireless network adapter via a cable connection, the second cable connection portion configured to:
receive the access information from the self-configuration portion;
transfer the access information to the third wireless network adapter via the cable connection; and
receive an acknowledgment message of the third wireless network adapter from the third wireless network adapter via the cable connection; and
wherein the wireless transceiver is connected to the third wireless network adapter via a wireless connection.

6. The wireless network adapter of claim 1, further comprising:
an indication portion configured to indicate that the self-configuration of the wireless network adapter is completed.

7. A wireless network adapter comprising:
a first cable connection portion configured to receive access information of a wireless network access point adapter from the wireless network access point adapter via a cable connection, the access information including a service set identifier, a verification mode, an encryption type and a security key;
a self-configuration portion configured to configure the wireless network adapter to operate in a client mode in the case that the first cable connection portion has received the access information and generate an acknowledgment message after the wireless network adapter is configured; and
a wireless transceiver connected to a wireless network access point, the wireless network access point configured by the wireless network access point adapter by using the service set identifier and the security key; and
wherein the first cable connection portion also sends the acknowledgment message to the wireless network access point adapter via the cable connection.

8. The wireless network adapter of claim 7, wherein the first cable connection portion is either directly connected to the wireless network access point adapter via the cable connection, or is connected to a second wireless network adapter via the cable connection and configured to receive the access information of the wireless network access point adapter from the second wireless network adapter.

9. The wireless network adapter of claim 7, further comprising:
a second cable connection portion connected to a third wireless network adapter via a cable connection, the second cable connection configured to transfer the access information to the third wireless network adapter via the cable connection and receive an acknowledgment message of the third wireless network adapter from the third wireless network adapter via the cable connection,
wherein the first cable connection portion is further configured to forward the acknowledgment message of the third wireless network adapter to the wireless network access point adapter.

10. The wireless network adapter of claim 7, further comprising:
an indication portion configured to indicate that the self-configuration of the wireless network adapter is completed.

11. A self-configuration method for a wireless network adapter, comprising:
receiving, by the wireless network adapter, a self-configuration instruction;
configuring, by the wireless network adapter, the wireless network adapter as a wireless network access point adapter after receiving the a self-configuration instruction; and
generating access information of the wireless network access point adapter, the access information including a service set identifier, a verification mode, an encryption type and a security key;
transferring the access information to a second wireless network adapter via a cable connection;
receiving an acknowledgment message from the second wireless network adapter via the cable connection; and
connecting the wireless network adapter to the second wireless network adapter via a wireless connection.

12. The self-configuration method of claim 11, wherein receiving the self-configuration instruction includes receiving input from one of a hardware button and a hardware switch.

13. The self-configuration method of claim 11, wherein receiving the self-configuration instruction includes receiving a settable menu option on the wireless network adapter from an external entity.

14. The self-configuration method of claim 11, further comprising:
indicating that the self-configuration instruction has been executed.

15. A self-configuration method for a wireless network adapter, comprising:
receiving access information of a wireless network access point adapter from the wireless network access point adapter via a cable connection;
storing the access information as setting parameters, the access information including a service set identifier, a verification mode, an encryption type and a security key;
configuring the wireless network adapter to operate in a client mode in the case that the wireless network adapter has received the access information;
generating an acknowledgment message after the configuring;
connecting, by the wireless network adapter, to the wireless network access point configured by the wireless network access point adapter by using the service set identifier and the security key; and sending the acknowledgment message to the wireless network access point adapter via a cable connection.

16. The self-configuration method of claim 15, further comprising:

transferring the access information to a third wireless network adapter via a cable connection;

receiving an acknowledgment message of the third wireless network adapter from the third wireless network adapter via the cable connection; and forwarding the acknowledgment message of the third wireless network adapter to the wireless network access point adapter via the cable connection.

17. The self-configuration method of claim 15, further comprising:

indicating that the configuring is successful.

* * * * *